F. M. STEVENS.
TARE SCALE.
APPLICATION FILED JULY 22, 1920.

1,368,302.

Patented Feb. 15, 1921.

INVENTOR
Frederick M. Stevens
BY
ATTORNEY

UNITED STATES PATENT OFFICE.

FREDERICK M. STEVENS, OF NEW YORK, N. Y., ASSIGNOR TO JOHN CHATILLON & SONS, OF NEW YORK, N. Y., A CORPORATION OF NEW YORK.

TARE-SCALE.

1,368,302.   Specification of Letters Patent.   Patented Feb. 15, 1921.

Application filed July 22, 1920. Serial No. 398,124.

*To all whom it may concern:*

Be it known that I, FREDERICK M. STEVENS, a citizen of the United States, and resident of New York city, in the county of New York and State of New York, have invented a certain new and useful Tare-Scale, of which the following is a specification.

This invention relates to tare scales having two pointers, one indicating the weight of the container, and the other adjustably mounted on the pinion shaft so as to be set to enable the net weight of goods to be read off directly without calculation. Such scales are largely used for weighing milk, among other things, and require a simple yet accurate weighing pointer adjusting means. As heretofore constructed such scales have had the goods pointer loosely mounted on the shaft and held by a thumb screw, which is objectionable because in setting the goods pointer at zero when the container is empty, displacement easily occurs, resulting in inaccurate weighing.

It is the object of this invention to provide a simple yet effective pointer adjusting mechanism which obviates objections to previous constructions and enables accurate adjustment of the goods weighing pointer to be quickly obtained.

In the accompanying drawings—

Figure 1:
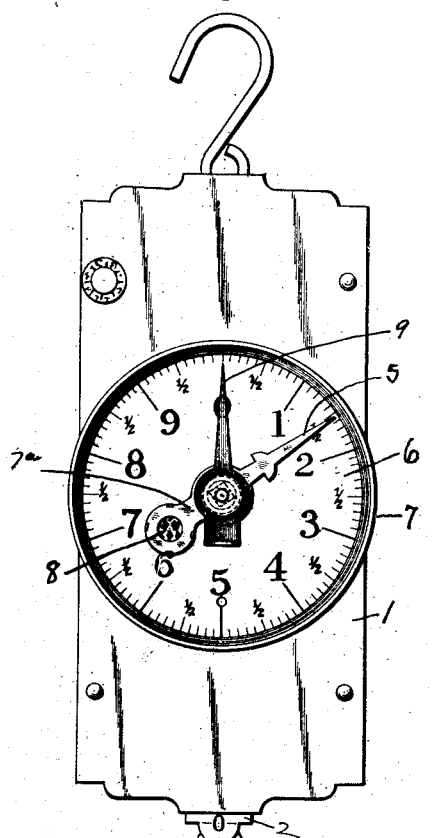
Figure 1 is an elevation of a scale embodying the invention.
Figure 2:
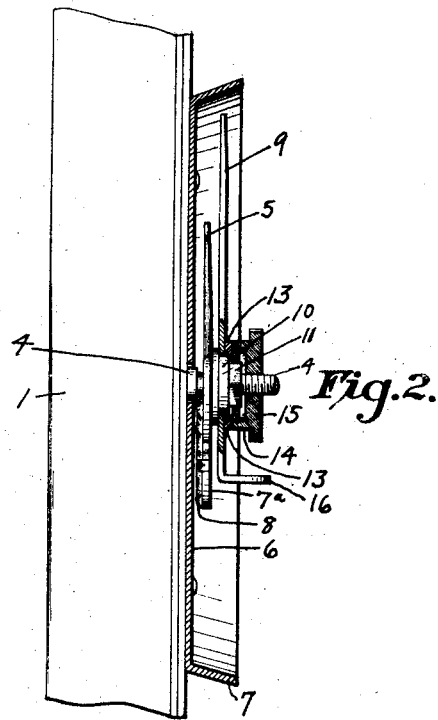
Fig. 2 is a side view, partly in section.
Figure 3:
Fig. 3 shows a washer.
Figure 3:
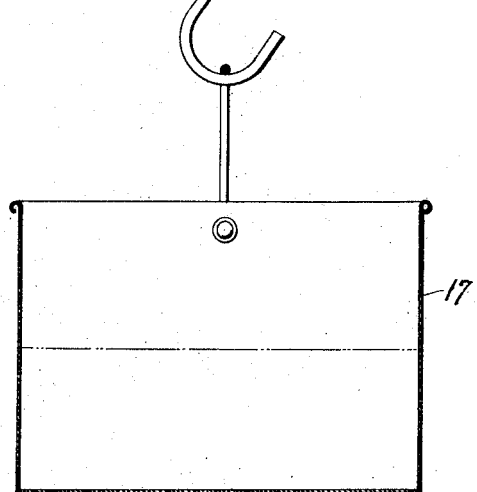

These scales are usually of the known spring type consisting of a casing 1 carrying a depending spring, a runner 2 suspended from the spring to carry a hook 3 or the like for the load, and a rack meshing with a pinion on shaft 4, the latter carrying a fixed pointer 5 moving over suitably graduated dial 6, the latter herein shown as being cupped to provide the protecting rim 7.

As stated, the pointer 5 is rigidly secured to the shaft 4 to always turn therewith, and ordinarily is used only to indicate the tare. This pointer is next the dial, distinctively colored, as black, and has a resilient counterbalancing end 7a carrying a felt pad 8.

The weighing distinctively colored pointer 9 is rotatable on the shouldered collar 10 fixed to shaft 4 and slightly separated from tare pointer 5 to move free thereof. Outside of collar 10, the shaft 4 is squared as at 11 to receive the square hole washer 12 having flange 13 on which bears the rim 14 of thumb screw 15 threaded on shaft 4. Pointer 9 also has counterbalancing upturned finger piece 16.

In operation, the empty container 17 is put on and its weight indicated by pointer 5. While still on, pointer 9 is loosened, end 8 of pointer 5 pressed against the dial to frictionally hold by felt 8 without marring the finish, and pointer 9 set to zero by means of finger piece 16. Setting of thumb screw 15 causes washer 12 to press on pointer 9 without causing the latter to turn. Upon releasing pointer end 7a, its resiliency lifts felt 8 from the dial surface to permit free rotation without marking. The container is now filled, and the weight of contents directly determined by pointer 9 on the scale graduations.

I claim:

1. In a two pointer tare scale, a dial, two pointers, a rotatable shaft carrying said pointers one of which is rigid and the other loose thereon, a shouldered collar rotatably carrying said latter pointer, a sliding washer outside said latter pointer turning with the shaft, and a thumb screw threaded on said shaft to set said latter pointer.

2. In a two pointer tare scale, a dial, two pointers, a rotatable shaft carrying said pointers one of which is rigid and the other loose thereon, one end of said pointer being resilient and carrying a friction pad adapted to be pressed against the dial, a shouldered collar rotatably carrying said latter pointer, a sliding washer outside said latter pointer turning with the shaft, and a thumb screw threaded on said shaft to set said latter pointer.

Signed at New York city, in the county of New York and State of New York, this 20th day of July, A. D. 1920.

FREDERICK M. STEVENS.